(No Model.)
D. LIPPY.
THRASHING MACHINE.
No. 299,408. Patented May 27, 1884.
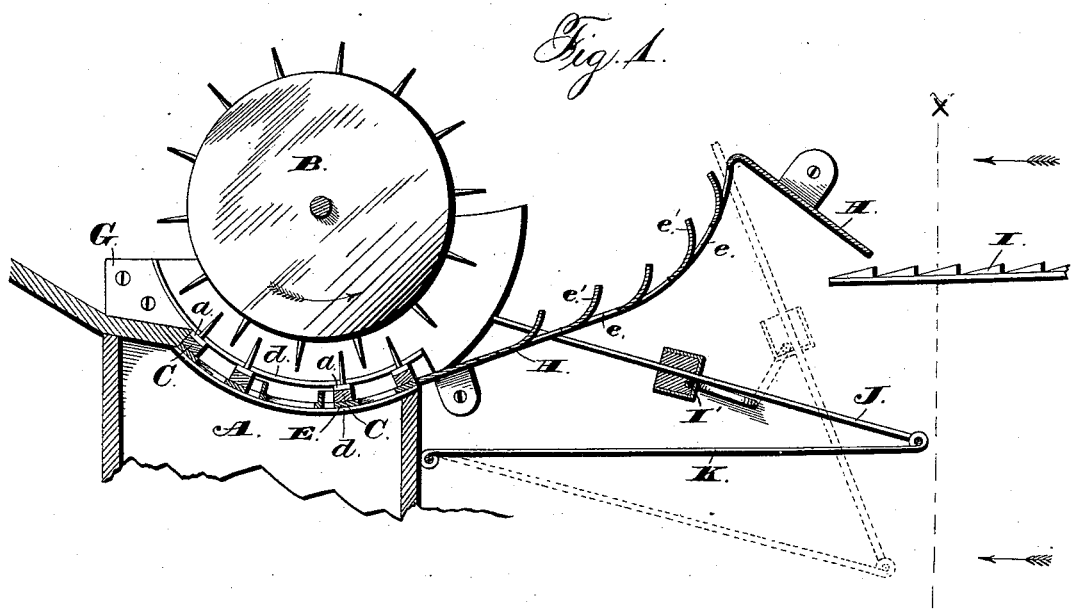
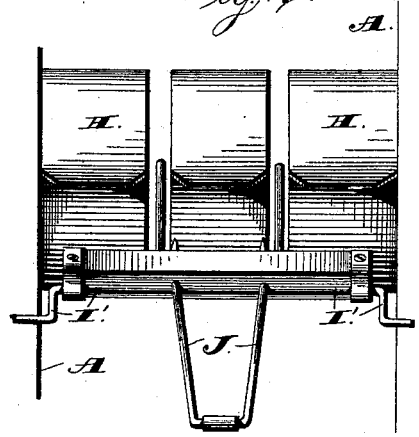
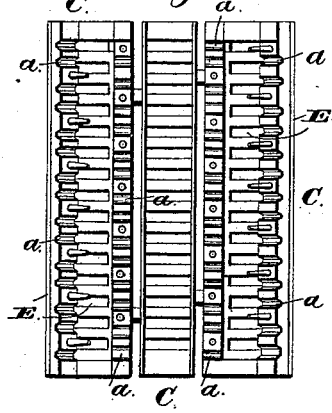
WITNESSES
Jas. E. Hutchinson
S. G. Nottingham
INVENTOR.
David Lippy,
Attorney.

UNITED STATES PATENT OFFICE.

DAVID LIPPY, OF MANSFIELD, OHIO.

THRASHING-MACHINE.

SPECIFICATION forming part of Letters Patent No. 299,408, dated May 27, 1884.

Application filed February 19, 1884. (No model.)

*To all whom it may concern:*

Be it known that I, DAVID LIPPY, of Mansfield, in the county of Richland and State of Ohio, have invented certain new and useful Improvements in Thrashing-Machines; and I do hereby declare the following to be a full, clear, and exact description of the invention, such as will enable others skilled in the art to which it appertains to make and use the same.

My invention relates to an improvement in thrashing-machines, the object of the same being to provide improved devices for thoroughly thrashing the grain from the straw without cutting or injuring the grain. A further object is to provide improved means for thoroughly separating the grain from the straw; and with these ends in view my invention consists in the parts and combinations of parts which will be more fully described, and pointed out in the claims.

In the accompanying drawings, Figure 1 is a view in longitudinal vertical section of a portion of a thrasher embodying my invention. Fig. 2 is a transverse vertical sectional view of the same, taken through the machine in the rear of the concave and its extension H in the plane of line $x\ x$ of Fig. 1; and Fig. 3 is a detached view of the concave.

A represents the frame of the machine, B the cylinder, and C the concave situated under the cylinder. This concave is composed preferably of two tooth-frames and a grate situated between the frames. Each tooth-frame is rectangular in shape and slightly concave on its upper face, and consists, essentially, of two side and two end pieces with an open center. The two side pieces in which the teeth are secured are provided between the teeth with grooves $a$, sufficiently large to allow grain to fall therein and be protected from the teeth of the cylinder. Immediately under each frame is secured a grate, E, preferably made of metal, onto which the loose grain as it is thrashed falls. These grates are considerably below the upper surface of the concave, thereby forming a depressed center for each frame, and are sufficiently open to allow the grain and the loose chaff to fall through onto an elevator or other conveyer situated within the machine-frame and under the concave. Between the two tooth-frames is located the independent grate, preferably made of metal, and provided with upturned edges, which latter rest in close proximity to the adjacent side pieces of the tooth-frames, sufficient space, however, being left to enable any grain that might fall between one of the frames and the grate to pass down to the elevator. In the present instance I have shown two tooth-frames and one independent grate; but it is evident that three tooth-frames could be employed and answer the same purpose, or the entire concave formed in one continuous piece and in divisions, as shown. In the present instance these parts are independent and removable, and are secured in the grooves or guides $d$, formed in the metallic plates G, which latter extend up to near the top of the machine-frame and protect it from undue wear. The grooves or guides $d$ (one on each side of the machine) are curved concentrically with the cylinder, and the sections of the concave slide easily therein, and can be removed, if necessary, by taking away a portion of the grain-board in front of the concave. As soon as the grain is thrashed from the straw, it falls down into the grooves or onto the grate, or onto the depressed centers of the tooth-frames, out of the reach of the teeth of the cylinder, and from thence onto the elevator. The centrifugal force imparted to the grain as it is thrashed causes it to strike first on the grate or one of the tooth-frames and falls through without being carried with the straw from off the concave, thereby making the separation much more complete. The concave is provided with curved extension or continuation H, over which the straw passes before it reaches the straw-carriers. This extension consists, preferably, of strips of metal secured in any suitable manner to the machine-frame, and curving upwardly until they reach a point at or above the top of the cylinder, and then abruptly inclining downwardly to enable the straw to fall onto the straw-carriers I. Each strip H is provided with openings $e$, formed by bending back the small pieces $e'$ of the strip, which latter rest in front of the slots thus formed, and prevent the straw from entering therein, and also form steps on which the straw stops or rests while the rake is making a return-stroke. This rake is provided with teeth, which move between the strips, and the head thereof is journaled to the crank-shaft I', which latter is supported in bearings in the side of the machine-frame. The rake-head is also provided with a depending arm or loop, J, or equivalent device, to which the free end of the guiding-bar K is pivotally secured, the opposite end of the said bar being secured to the machine-frame at a point below the cylinder. This guiding-bar is intended simply to hold the rake-teeth in position and turn the rake-head from one position to another as the crank is turned. By turning the crank in the proper direction the rake-teeth are caused to enter between the strips H, immediately behind the cylinder and in front of the grain on the said strips, then rise up and move rearwardly, carrying with them the straw. After the teeth have dropped the straw onto the straw-carriers, they again drop and move forwardly under the strips, and then pass inwardly and carry up another lot, and so on continuously. The openings in the strips, besides forming rests or seats for the straw, also allow the loose grain to fall onto the elevator, while the remaining grain, which is intimately mixed with the straw, is carried over to the straw-carrier and there dislodged.

This construction of parts is exceedingly simple, is very effective in thrashing grain, and can be manufactured and sold as cheaply as the machines ordinarily employed.

I do not limit myself to any particular style of straw carrier or elevator; neither do I limit myself to the exact construction of parts shown and described, but consider myself at liberty to use any approved form of carrier and elevator, and also change the details of the several parts without departing from the spirit of my invention.

Having fully described my invention, what I claim as new, and desire to secure by Letters Patent, is—

1. The combination, with a thrashing-machine cylinder, of a concave consisting, essentially, of a rectangular frame having an open center, the two sides of said frame being provided on their upper surfaces with transverse grooves and with teeth situated between the grooves, and a grate secured to the lower face of said frame, substantially as set forth.

2. In a thrashing-machine, the combination, with a cylinder, of a concave composed of two small concaves and an intermediate grate, each small concave being provided with teeth, and with grooves or gutters between the teeth, open center, and a grate forming a bottom to the said open center, substantially as set forth.

3. The combination, with a cylinder and a concave, the latter provided with an extension having slots therein, and with steps for preventing the straw from moving back toward the cylinder, of a rake situated under said extension and provided with teeth, which latter enter the slots and carry the straw up and over said extension, substantially as set forth.

4. In a thrashing-machine, the combination, with a cylinder and concave, of the slotted extension H, provided with steps formed as described, and the rake and bar for holding the rake in position, all of the above parts operating as described.

In testimony whereof I have signed this specification in the presence of two subscribing witnesses.

DAVID LIPPY.

Witnesses:
M. E. DOUGLAS,
E. H. HOUSTON.